Patented Nov. 21, 1939

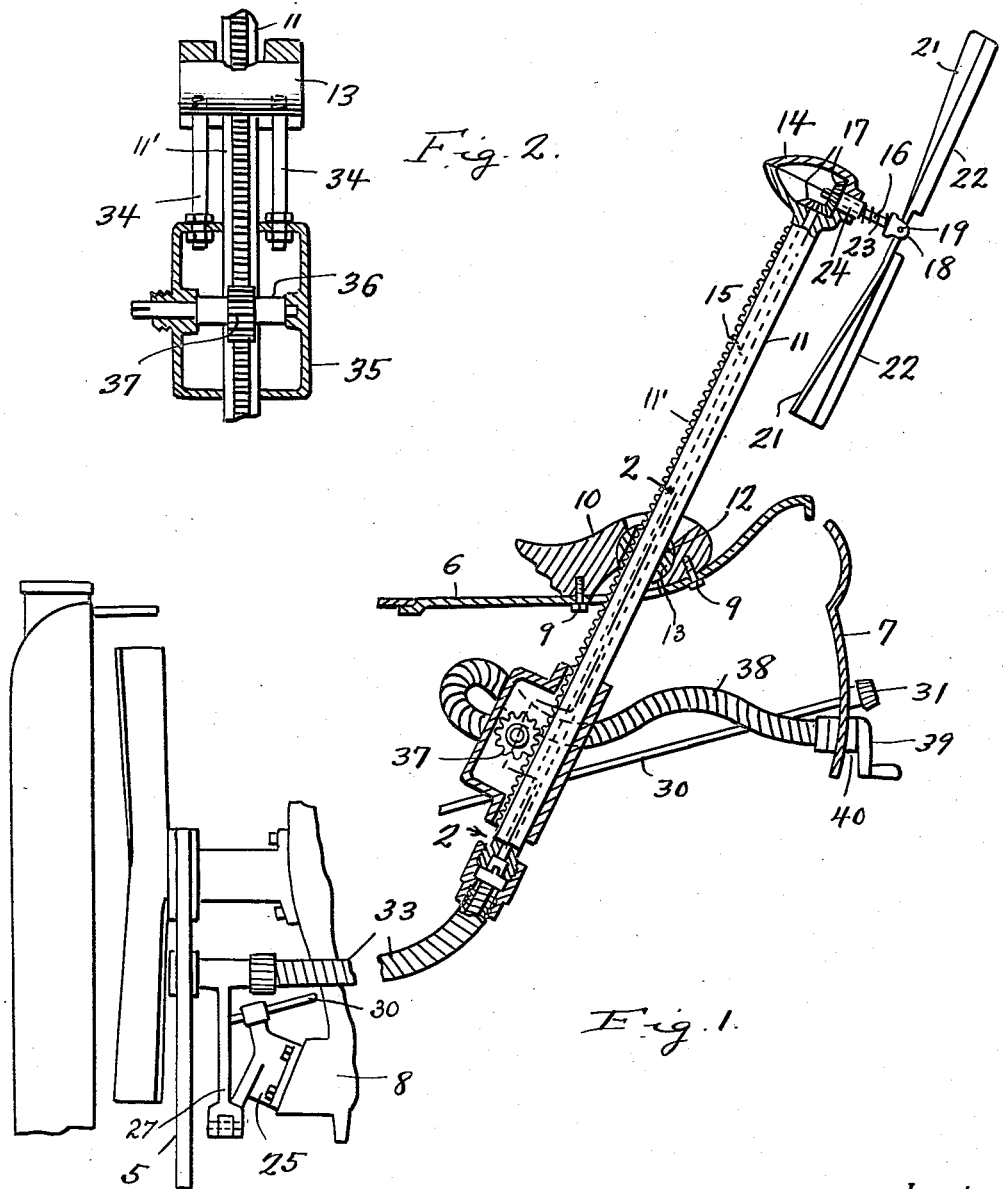

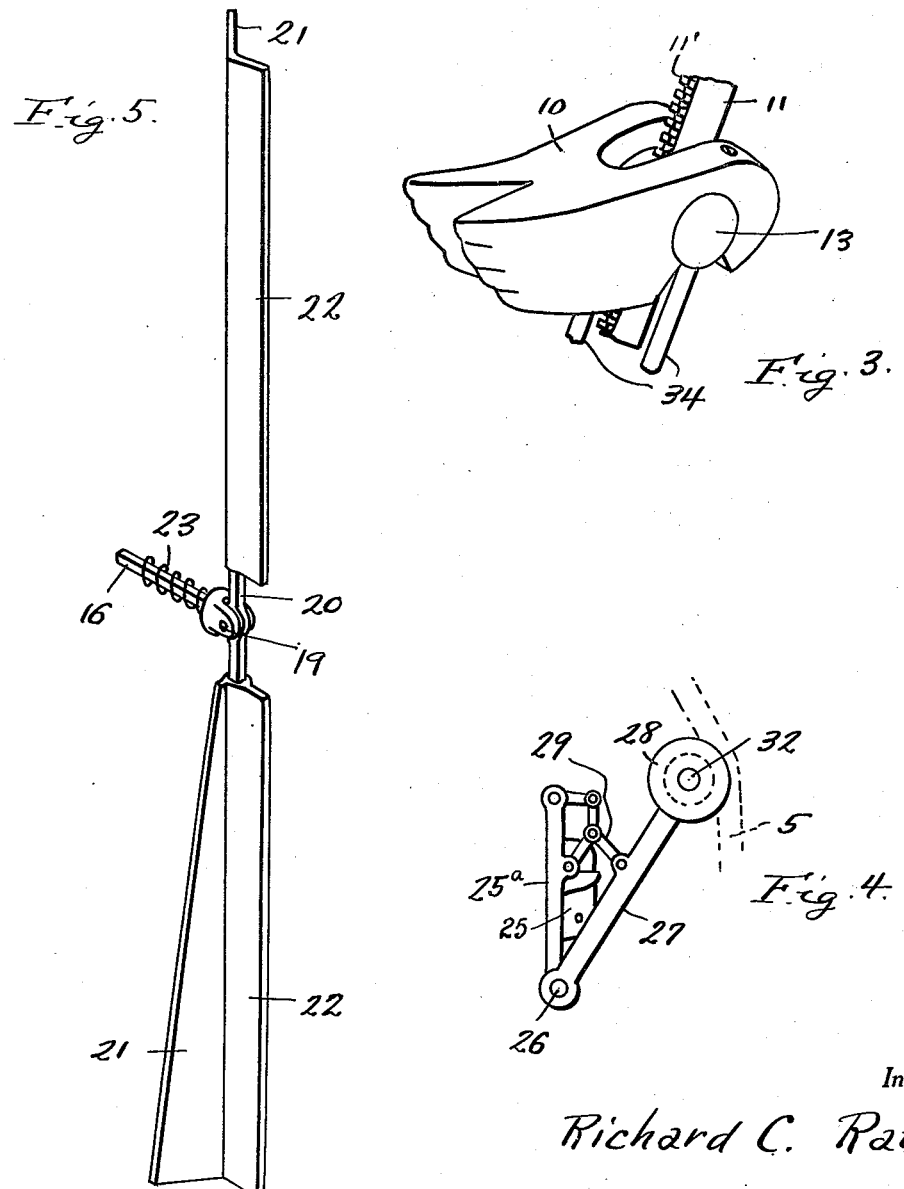

2,181,066

UNITED STATES PATENT OFFICE 2,181,066

ROTARY WINDSHIELD WIPER

Richard C. Rau, Jamaica Plain, Mass.

Application June 11, 1938, Serial No. 213,263

2 Claims. (Cl. 15—250)

This invention relates to windshield wipers of the type used for clearing snow and rain from windshields of automobiles or other vehicles.

An object of the present invention is to provide a device of this character which will be positive and efficient in operation and which embodies a power driven fan the blades of which are equipped with wiper elements, the fan serving to force the snow and rain away from the windshield while the wiper elements on the fan, rotating therewith, will serve to wipe a portion of the outer surface of the glass of the windshield free of rain and snow for maintaining a portion of the windshield in clear condition.

The invention, together with its advantages will be readily understood from a study of the following description taken in connection with the accompanying drawings, wherein:

Figure 1 is an enlarged detail view partly in section and partly in elevation showing the application of the invention to an automobile.

Fig. 2 is a detail sectional view taken substantially on the line 2—2 of Fig. 1.

Fig. 3 is a perspective view of a guide and rack bar assembly hereinafter more fully referred to.

Fig. 4 is a side elevational view showing a pulley assembly for utilizing the fan belt for driving the fan part of the wiper and Fig. 5 is a perspective view of the wiper equipped fan.

Referring to the drawings by reference numerals, it will be seen that 5 indicates generally a portion of a conventional fan belt forming part of an internal combustion engine, while 6 indicates the portion of the engine cowl and 7 indicates a portion of the instrument board, forming part of an automobile. A portion of the engine block is indicated by the reference numeral 8.

In accordance with the present invention, there is suitably mounted on the cowl 6 and secured thereto by screws or other fastening elements 9, a casting 10, that as suggested in Fig. 3, is of ornamental shape and appearance and serves as a guide for a tubular shaft housing 11. The shaft housing 11 works through a slot 12 provided therefor in a cylindrical member 13 rotatably supported within the guide 10, and on its upper end the shaft casing 11 is provided with a gear housing 14 that is also of ornamental construction and appearance.

The cylindrical member 13 provides an adjustable bearing for rocking of the shaft housing 11 in the casting 10 so that said housing may be adjusted in said casting to move the upper end thereof toward the windshield (not shown) as occasion may require, the member 13 fitting tight in the casting 10 so that it will be frictionally held in adjusted position.

Journalled within the shaft casing 11 is a shaft 15 while journalled within a bearing provided therefor in one wall of the gear case 14 is a fan shaft 16. Drive from the shaft 11 is transmitted to the shaft 15 through the medium of gearing 17 arranged within the casing 14 as shown.

On the outer end thereof, the fan shaft 16 is provided with a yoke 18 between the ears of which is pivoted as at 19 the intermediate portion of a blade shank 20.

The blade shank 20 has secured to the ends thereof blades 21. Blades 21 have formed integrally therewith and extending at substantially right angles thereto wiper elements 22 that are adapted to have wiping contact with the windshield glass. The wiping elements 22 are held in yielding contact with the windshield glass through the medium of a coiled spring 23 suitably provided on the fan shaft 16 and bearing at one end against the yoke 18 and at an opposite end against the bearing 24 provided therefor in the wall of the gear case 14.

Also in accordance with the present invention, there is provided on the motor block 8 a suitable bracket 25 which has pivoted thereto as at 26, one end of an arm 27. On the free end of the arm 27 is suitably journalled a pulley 28 that is adapted to be moved into and out of engagement with the fan belt 5.

For swinging the arm 27 to move the pulley 28 into and out of engagement with the belt 25, arm 27 is connected with a portion 25a of the bracket 25, through the medium of a toggle link assembly 29 that is operated by the operator of the vehicle through the medium of a suitably provided shaft 30. One end of the shaft 30 extends through a suitable opening provided therefor in the instrument board 7 and is equipped with a knob or handle 31 to facilitate rotation of the shaft 30 to thereby operate the toggle link assembly 29 for swinging the pulley carrying arm 27 in the desired direction to engage or disengage pulley 28 and belt 5.

The shaft 32 for the pulley 28 is connected with the aforementioned shaft 11 through the medium of a flexible shafting 33 shown in Fig. 1. Thus it will be seen that when the pulley 28 is in contact with the belt 5 and the motor of the vehicle is running, drive is transmitted to the shaft 11 and from the shaft 11 to the gearing 17 between said shaft 11 and the fan shaft 16 for revolving the fan 21. Obviously, as the fan 21 revolves with the wipers 22 in contact with the outside surface of the windshield glass, a portion thereof will be maintained in clear condition.

The casing 11 may be raised or lowered as found desirable. To this end, there is suspended from the cylindrical member 13, through the medium of hanger bolts 34 a gear case 35 through which the lower portion of the casing 11 slides. Suitably journaled in the gear case 35 is a shaft 36 on which is mounted a pinion 37 that is in constant mesh with a rack bar 11' provided in one side of the casing 11 and extending longitudinally of the casing. Shaft 36 has one end suitably connected with a flexible shafting 38 that at its opposite end is connected with a suitable crank 39 rotatably supported as at 40 on the instrument board 7.

It will thus be seen that the gear case 35 is so suspended from the member 13 as to rock therewith, and as is necessary incidental to a raising and lowering of the shaft casing 11 to position the fan in operative or inoperative position with respect to the windshield.

To raise the fan into a position for maintaining clear a portion of the windshield, the operator by turning the crank 39, revolves the shaft 38, and drive from the shaft 38 is transmitted through the pinion 37 and rack bar 11' to the casing 11 for sliding the casing substantially vertically to raised or lowered position.

With the casing 11 in raised position and the wipers 22 carried by the fan blades 21 in wiping contact with the windshield, said fan may be driven or set into operation by the operator turning the shaft 30 in a direction to move the pulley 28 into driven contact with the belt 5 whereupon drive from the belt will be transmitted to the fan in a manner hereinbefore explained for revolving the latter rapidly. Obviously as the fan revolves the current of air set up thereby will serve to tend to keep the surrounding area free of rain or snow, while the wiping blades 22 in contact with the outer surface of the windshield will serve to maintain a circular area of the windshield clear of accumulations of rain, snow, sleet, and the like, thus insuring clear vision to the operator.

It is thought that a clear understanding of the construction, utility, advantages and operation of a windshield wiper embodying the features of the present invention will be had without a more detailed description.

Having thus described the invention, what is claimed as new is:

1. A windshield wiper comprising, in combination, a guide adapted to be mounted on the engine cowl of an automobile, a shaft casing disposed at an angle to the perpendicular and movable through said guide, a gear casing on the upper end of said shaft casing, a rotary fan having a shaft extending into said gear casing, a shaft in said shaft casing, gearing in said gear casing connecting the fan shaft and the second-named shaft, and mechanism mounted beneath the cowl and connected with said shaft casing for moving the latter in either of two directions through said guide, means for driving the shaft in said shaft casing, and said fan having blades provided with wipers extending therefrom and adapted to engage the outer surface of a windshield.

2. A windshield wiper for automobiles comprising a guide adapted to be mounted on the cowl of the automobile, an elongated tubular casing extending through said guide and cowl in upstanding position, said casing being endwise slidable in said guide and swingable therein to adjust the upper end thereof relative to the windshield, a fan-like rotary wiper element at the upper end of said casing and having a shaft extending into said casing, a drive shaft journaled in said casing and operatively connected to the first-mentioned shaft, means to operate said drive shaft, and manipulative means operative from the instrument board of the automobile for moving said casing endwise.

RICHARD C. RAU.